(12) United States Patent
Walker et al.

(10) Patent No.: US 9,681,496 B2
(45) Date of Patent: Jun. 13, 2017

(54) HIGH TEMPERATURE FURNACE HAVING RECONFIGURABLE HEATER CIRCUITS

(71) Applicant: Fluke Corporation, Everett, WA (US)

(72) Inventors: Richard W. Walker, Alpine, UT (US); Tian Xia, Shanghai (CN); Jiajun Yan, Shanghai (CN)

(73) Assignee: Fluke Corporation, Everett, WA (US)

( * ) Notice: Subject to any disclaimer, the term of this patent is extended or adjusted under 35 U.S.C. 154(b) by 1111 days.

(21) Appl. No.: 13/764,578

(22) Filed: Feb. 11, 2013

(65) Prior Publication Data

US 2014/0153606 A1 Jun. 5, 2014

(30) Foreign Application Priority Data

Dec. 5, 2012 (CN) .......................... 2012 1 0516574

(51) Int. Cl.
*H05B 1/02* (2006.01)
*F27B 17/02* (2006.01)
(Continued)

(52) U.S. Cl.
CPC ............... *H05B 1/02* (2013.01); *F27B 17/02* (2013.01); *F27D 11/00* (2013.01); *G01K 15/005* (2013.01)

(58) Field of Classification Search
CPC F27B 17/02; H05B 1/02; F27D 11/00; G01K 15/005; G01K 15/002; G01K 15/00
(Continued)

(56) References Cited

U.S. PATENT DOCUMENTS 4,851,646 A * 7/1989 Perala ................... A61H 33/063
219/483
5,796,076 A 8/1998 Azuma
(Continued)

FOREIGN PATENT DOCUMENTS

CN 1796969 A 7/2006
CN 1837797 A 9/2006
(Continued)

OTHER PUBLICATIONS

"9114 Freeze Point Furnace User' Guide," Rev. 661601, Fluke Corporation, Hart Scientific Division, American Fork, Utah, © 2006, 63 pages.
(Continued)

*Primary Examiner* — Hung D Nguyen
(74) *Attorney, Agent, or Firm* — Seed IP Law Group LLP (57) ABSTRACT

The core of a high temperature furnace has an elongated central test cavity for testing/calibration of a temperature-sensitive component, such as the probe of a thermocouple. At least three electrical heating elements as positioned adjacent to the test cavity, including two elements adjacent to the opposite end portions of the test cavity, respectively, and a center element between the end elements. A uniform temperature profile is maintained in the cavity by control circuitry that manages the supply of electrical power to the heating elements, by periodically configuring interconnections of the elements during multiple phases of a duty cycle. The duty cycle includes a first phase in which current is passed through the center element, a second phase in which current is passed through the end elements in series, and a third phase in which current is passed through one of the end elements and also through the center element without passing current through the other end element.

21 Claims, 10 Drawing Sheets

(51) Int. Cl.
*F27D 11/00* (2006.01)
*G01K 15/00* (2006.01)

(58) Field of Classification Search
USPC ....... 373/135, 136, 118, 126, 127, 128, 130,
373/120, 117; 374/1, 11, E15.001;
219/390, 395, 474, 476–479, 483, 486,
219/494, 507, 508, 509
See application file for complete search history.

(56) References Cited

U.S. PATENT DOCUMENTS

| | | | |
|---|---|---|---|
| 5,900,177 A | 5/1999 | Lecouras et al. | |
| 6,080,971 A * | 6/2000 | Seitz | F24H 9/2028 219/483 |
| 7,607,309 B2 | 10/2009 | Liebmann | |
| 7,669,427 B2 | 3/2010 | Walker | |
| 7,909,504 B2 | 3/2011 | Sjogren | |
| 9,095,006 B2 * | 7/2015 | Yue | H05B 3/20 |
| 2008/0213449 A1 * | 9/2008 | Wisner | A47J 39/006 219/428 |

FOREIGN PATENT DOCUMENTS

| | | | |
|---|---|---|---|
| CN | 101183093 A | | 5/2008 |
| CN | 101221445 A | | 7/2008 |
| CN | 201607292 U | * | 10/2010 |
| JP | 2008224289 A | | 9/2008 |
| WO | 2010/040360 A1 | | 4/2010 |

OTHER PUBLICATIONS

English Translation of Search Report for Application No. 201210516574.5, 3 pages.
Extended EP Search Report for Application No. 13195470.3-1353, dated Dec. 12, 2014, 8 pgs.

* cited by examiner

HIGH TEMPERATURE FURNACE HAVING RECONFIGURABLE HEATER CIRCUITS

BACKGROUND

The present invention relates to heater circuits for high temperature furnaces, and particularly to heaters for calibration furnaces having internal test cavities and multiple heating zones. In such a furnace, it is desirable to achieve a uniform temperature profile throughout the test cavity for reliable testing and/or calibration of temperature-sensitive elements such as thermocouple probes.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention provides a high temperature calibration furnace having a core with an elongated central test cavity for testing/calibration of a temperature-sensitive component. The core has at least three electrical heating elements adjacent to the test cavity, including a first end heating element adjacent to a first end portion of the test cavity, a second end heating element adjacent to a second end portion of the test cavity opposite the first end portion thereof, and a central heating element between the first and second end heating elements. Control circuitry manages the supply of electrical power to the first, second and third electrical heating elements by periodically configuring interconnections of the heating elements during multiple phases of a duty cycle. The duty cycle includes a first phase in which current is passed through the central heating element, a second phase in which current is passed through the first and second end heating elements in series, and a third phase in which current is passed through one of the first and second end heating elements and also through the central heating element without passing current through the other of the first and second end heating elements.

The present invention also provides a method of operating a high temperature calibration furnace of the type having: an elongated central test cavity for testing/calibration of a temperature-sensitive component; and three electrical heating elements including a first end heating element adjacent to a first end of the test cavity, a second end heating element adjacent to a second end of the test cavity opposite the first end thereof, and a central heating element between the first and second end heating elements. Such method includes managing the supply of power to the three electrical heating elements by periodically configuring interconnections of the three heating elements during multiple phases of a duty cycle, such duty cycle including: a first phase during which electrical current is passed through the central heating element; a second phase during which electrical current is passed through the first and second end heating elements in series; and a third phase during which electrical current is passed through the central heating element and one of the first and second end heating elements without passing current through the other of the first and second end heating elements.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
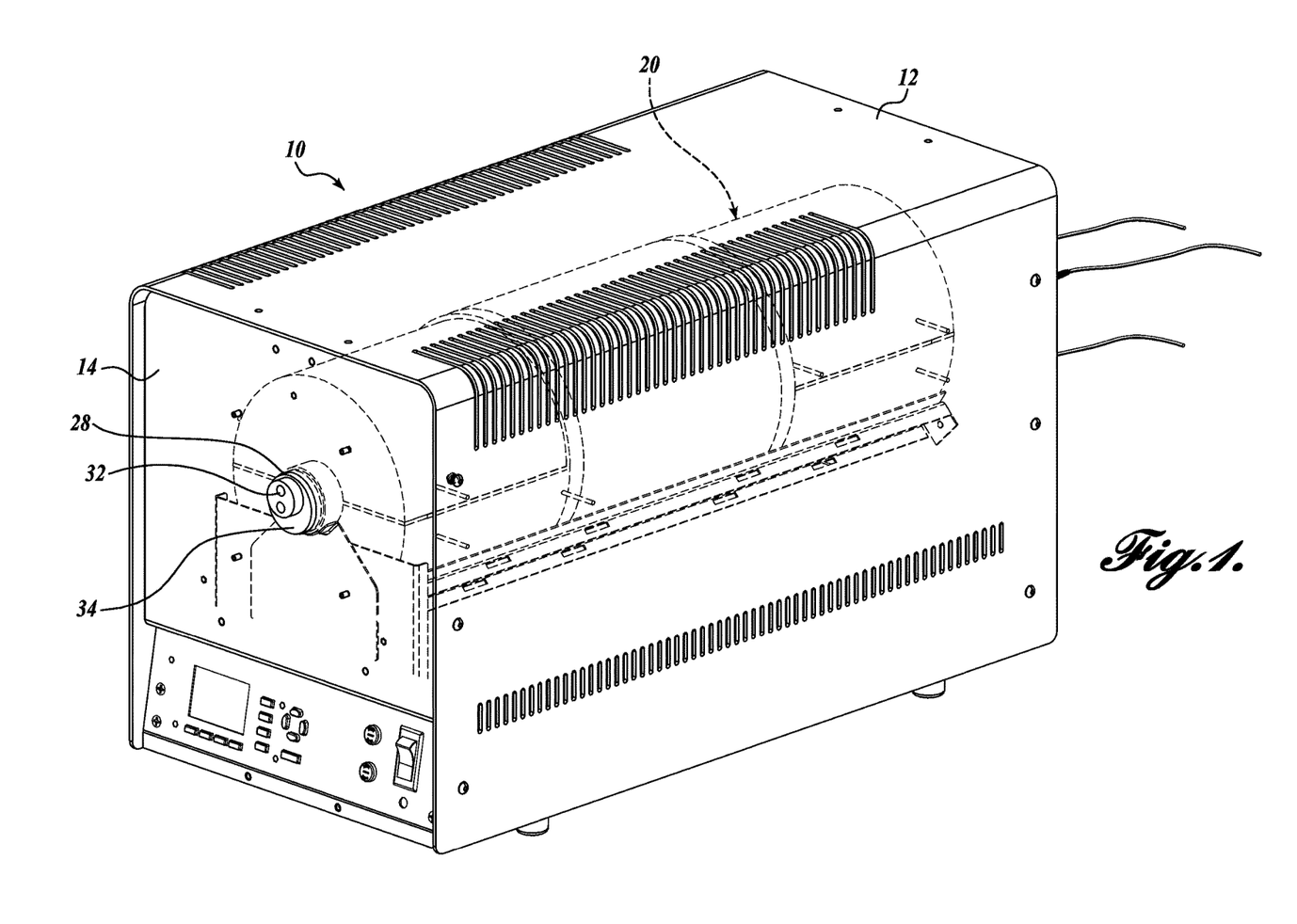
FIG. 1 is a somewhat diagrammatic top perspective of a high temperature furnace in accordance with the present invention.
Figure 2:
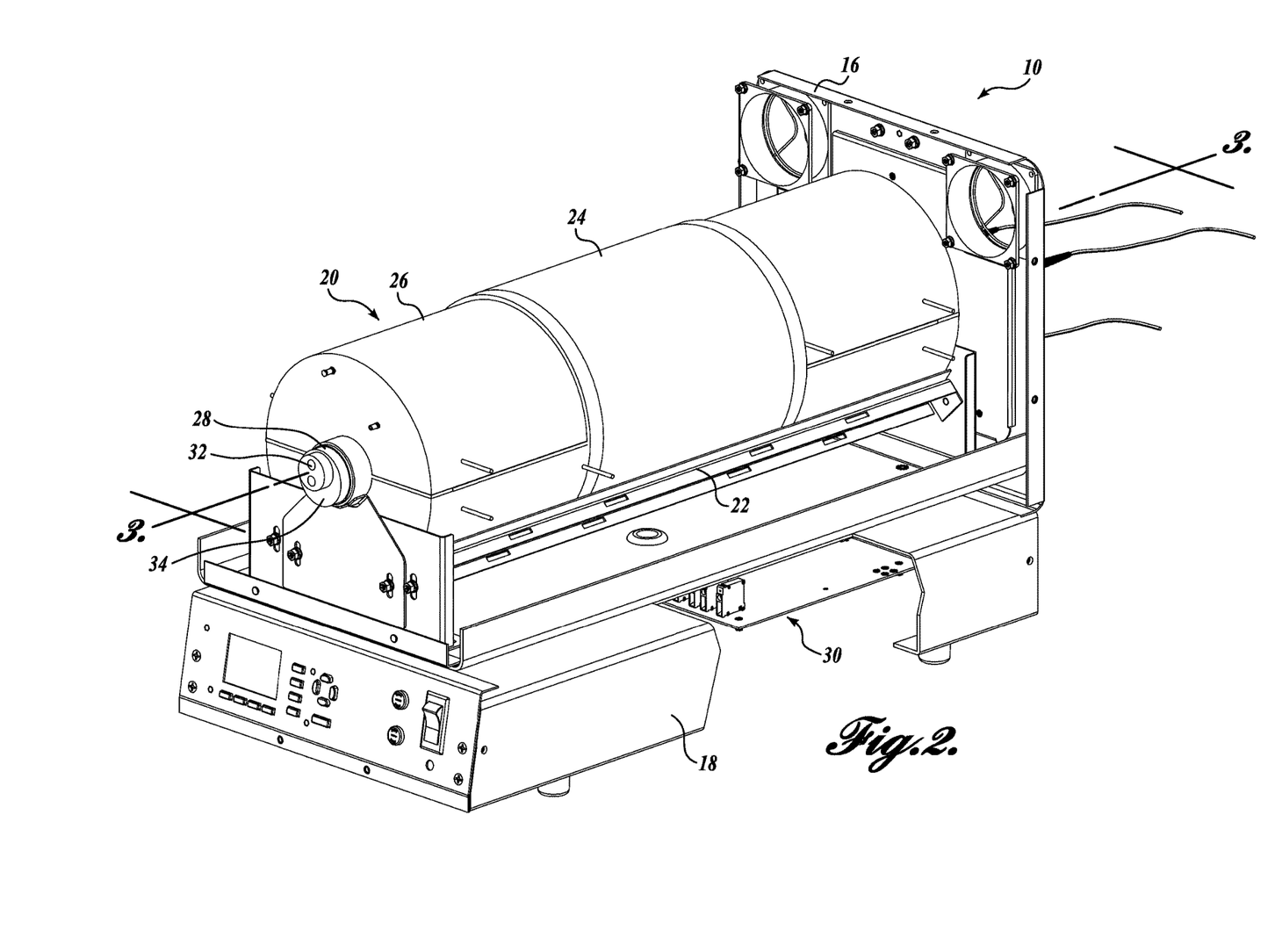
FIG. 2 is a top perspective corresponding to FIG. 1 but with some parts removed and parts broken away.

With reference to FIGS. 1 and 2, a representative furnace 10 in accordance with the present invention can have a thin-walled housing including a vented top and side closure member 12, front panel 14, and rear panel 16. These parts connect to and are supported on a base 18. The base has a mounting and support structure for the internal core 20 of the furnace. The core is cylindrical and, in the illustrated representative embodiment, oriented horizontally. For example, the mounting structure can include a concave cradle 22 and an upper mounting clamp or saddle 24. The cradle and saddle hold the heater 26, which can be formed in upper and lower halves.

The heater has internal heating elements, including separate elements at each end portion and at the central portion. The elements heat an internal test zone or cavity. In the illustrated embodiment the test cavity is the central portion of the internal bore of a longitudinally extending tube 28. Power to the heating elements is managed by a controller 30 which can be mounted in the housing base 18. As described in detail below, the controller operates the separate heating elements to maintain an even temperature along at least a major portion of the test cavity.

In use, heat sensitive elements to be tested or calibrated, such as the probes of thermocouples, can be positioned in the test zone (tube bore), such as by insertion through one or more apertures 32 of a front end plug 34. The furnace is designed for operation at very high temperatures, such as in the range of 300° C. to 1200° C. Heat can be dissipated from the housing by one or more fans drawing cooling air through the vents of the housing and exhausting the air through openings in the rear panel 16.

Figure 3:
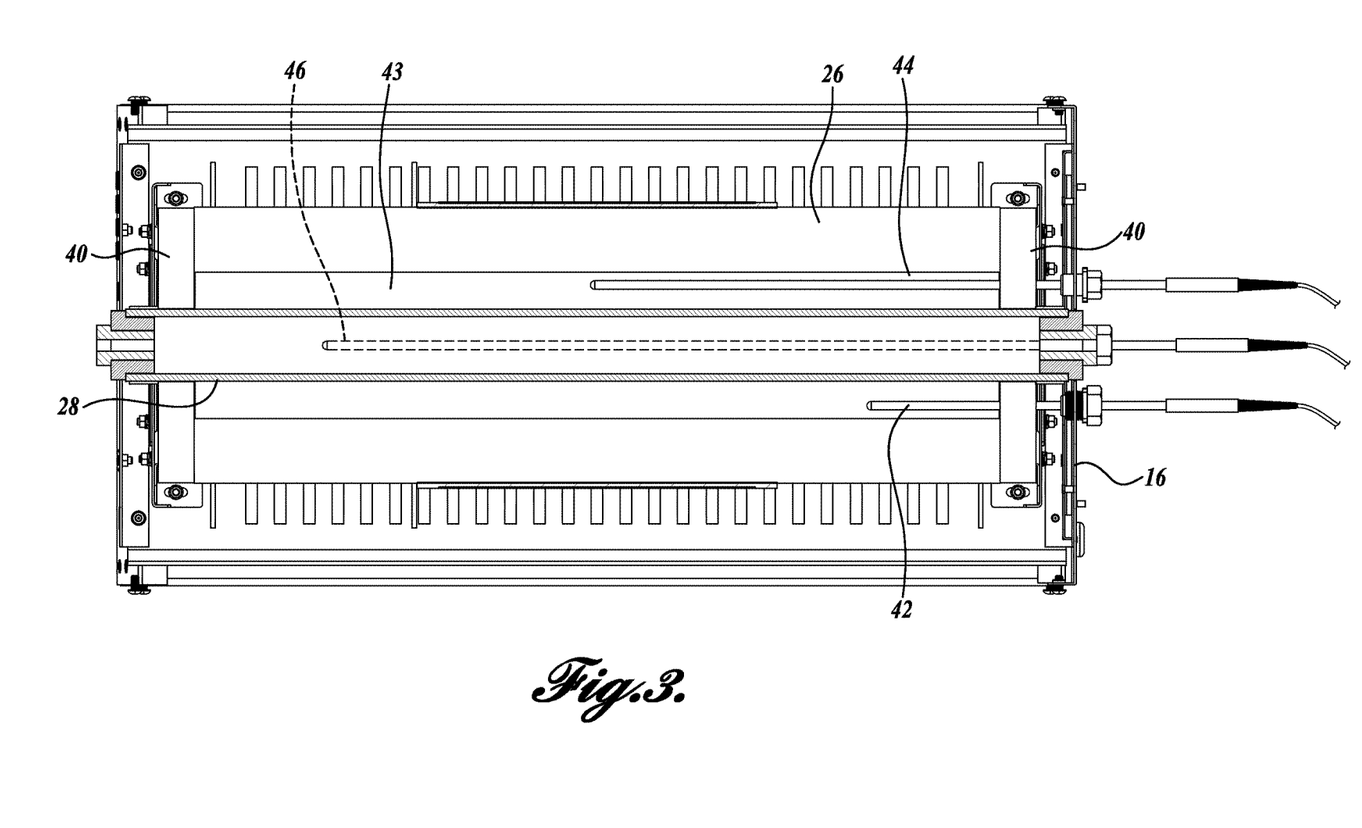
FIG. 3 is a section of an interior portion of the furnace of FIGS. 1 and 2, taken along line 3-3 of FIG. 2.

In the plan view of FIG. 3 (horizontal axial section), it can be seen that the interior of the tube 28 is open and unobstructed. The opposite ends of the tube are supported in end plates 40 of the heater component 26, but an annular space 43 is provided between the outer periphery of the tube 30 and the inner periphery of the cylindrical heater 26 along the length of the test zone.

Temperature sensors 42, 44, and 46 (such as high precision thermocouples) have probes that extend into the annular space 43 at different longitudinal locations. The sensors can be high precision thermocouples having stems for mounting the probes to the housing end plate 16 or other appropriate support structure. One probe extends a short distance into the space 43, a second probe extends approximately halfway into the space 43, and a third probe extends much farther into the space 43. Tube 28 necessarily is a highly heat conductive, high temperature, structurally stable material, such as a high temperature ceramic or quartz. The temperatures sensed by the probes correspond to the temperature inside the tube, i.e., in the test cavity.

Figure 4:
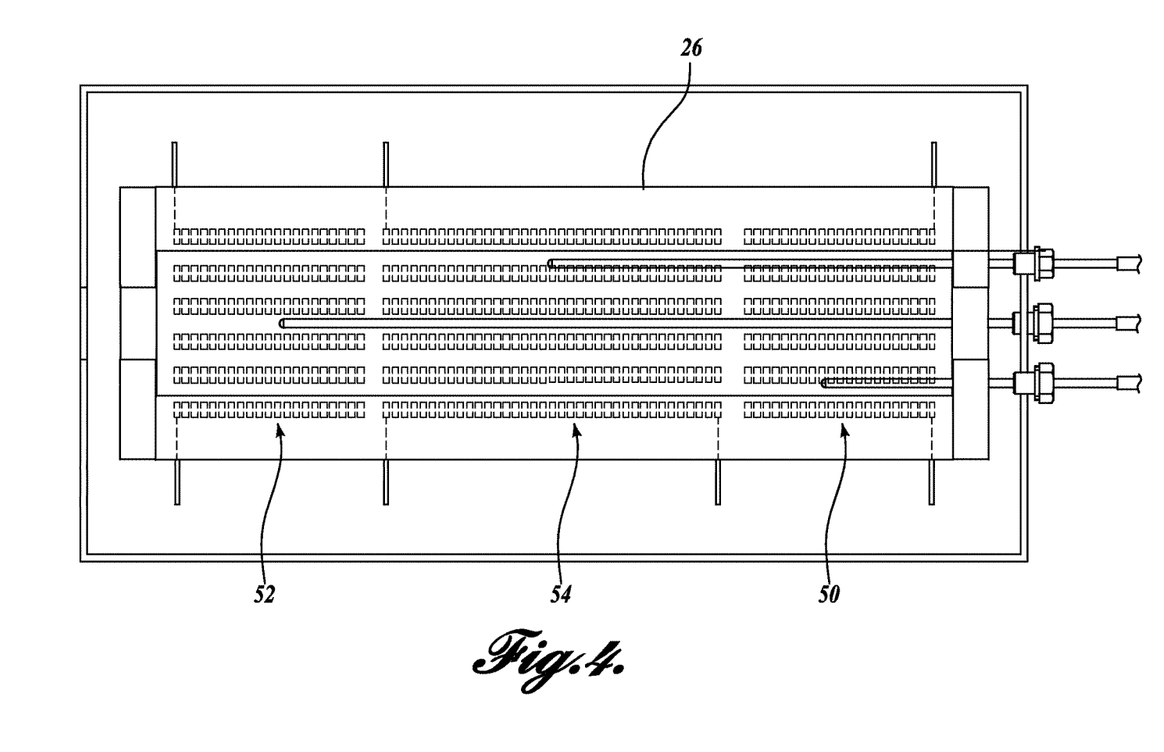
FIG. 4 is a simplified top plan corresponding to FIG. 3 with some parts deleted, parts broken away, and parts shown diagrammatically, illustrating a multiple-zone heater component.
Figure 5:
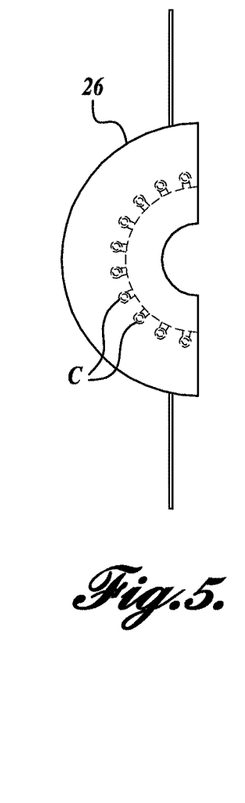
FIG. 5 is a diagrammatic end elevation of the heater component of FIG. 4.

In the simplified plan view of FIG. 4, and the corresponding end elevation of FIG. 5, other aspects of the heater 26 are illustrated. The heater is formed of a high temperature insulating material in which electric resistance heating elements are partially embedded. In a representative embodiment, the heater can be a molded fibrous ceramic, and the conductors C of the heating elements are mounted in slots that open radially inward toward the test cavity. Three separate electric resistance heating elements are provided. A first element 50 extends approximately one quarter of the longitudinal length of the heater and encircles a first end portion thereof. A second element 52 extends for about one quarter of the length of the heater at the other (second) end thereof. The third element 54 extends for about one half the length of the heater in the central portion thereof, in between the end elements 50, 52.

As illustrated in FIG. 5, the heat producing conductors C of each heating element are closely spaced around the circumference of the heater. FIGS. 4 and 5 show the bottom half of the heater, but the top half is the mirror image, and the conductors of each element are connected in series at the top and bottom to form one continuous element that extends 360 degrees around the inner cylindrical space in which the central tube is fitted.

In order to achieve a uniform axial temperature profile throughout the test cavity, it is preferred that there be control of three aspects of the temperature profile: the average temperature over the region of interest, the slope of the temperature profile through the center of the region (i.e., the difference in temperature from one end of the region to the other), and the "curvature" of the temperature profile (variations along the region of interest in the situation where the slope of the temperature profile is not linear). Corrections can be achieved if heat from each of the three heater sections is adjustable relative to the others.

In general, a controller is provided to manage the amount of power each heater section receives. Time is divided into equal duration control cycles. Within each control cycle, each heater is switched on for a precise amount of time to supply a precise amount of energy. Over many control cycles, the average amount of electric power that the heating elements receive determines the temperature within the furnace. Ideally, each heating element would be controlled independently of the others, in combination with temperature monitoring at a multitude of locations, so that the temperature profile can be fully adjusted and made uniform. In practice, such individual control and complicated monitoring is difficult to achieve and expensive. For example, the furnace with which the present invention is concerned has a power supply of 240 V AC. A 120 V supply would require too much current to produce the necessary amount of power, particularly at higher temperatures. The longer center heating element is rated for 240 V so it can be driven directly from the 240 V mains supply. However, each of the end heating elements is shorter (one-half the length of the center element), with corresponding lower resistance and rated for only 120 V.

To allow the outer sections to operate from 240 V, they have been wired in series with their common current switched by one triac, for example. Another triac controls the power to the center section. A problem with this design is that it allows only two independent variables of temperature control. The average temperature in the furnace can be adjusted, and typically the curvature of the temperature profile can also be adjusted, but there is no efficient and effective means to adjust the slope of the temperature profile through the center, because the end heating elements always receive the same amount of power. In practical implementations of a heater of this type, one end tends to be colder than the other, which can be due to a variety of factors including differences in performance of the separate heating elements and/or the overall design of the furnace resulting in greater heat loss toward one end than the other.

The present invention proposes an improved system and circuitry for reconfiguring the connections of the separate heating elements during a control cycle, using the uniform power (preferably 240 V AC), without subjecting the lower rated end heating elements to the full power voltage, but allowing different amounts of power to the respective end elements to achieve a desired temperature profile.

Figure 6:
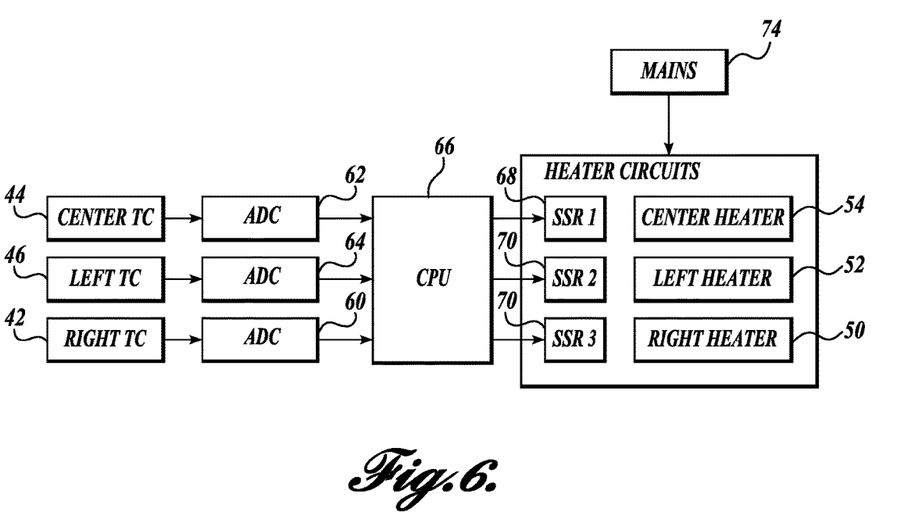
FIG. 6 is a simplified block diagram of components of a furnace in accordance with the present invention.
Figure 6A:
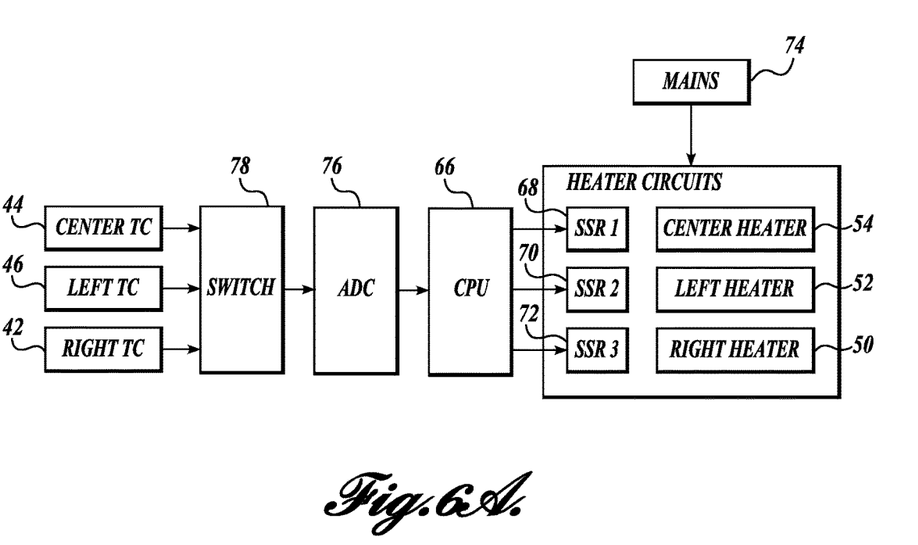
FIG. 6A is a corresponding block diagram of an alternative embodiment.

FIG. 6 is a simplified block circuit diagram of a representative embodiment. The three temperature sensors (thermocouples) 42, 44, 46, each have a dedicated analog-to-digital converter 60, 62, 64, respectively, conveying temperature signals to a processor-controller 66. The processor, in turn, controls a series of solid-state relays 68, 70, 72 that configure the connections of the heating elements 50, 52, 54 to the power supply 74. The arrangement of FIG. 6A is essentially identical, the only difference being that a single analog-to-digital converter 76 is used with a switch 78 for polling the temperature signals from the sensors 42, 44, 46. The central processing unit 66 still monitors the temperatures and controls the relays 68, 70, 72 appropriately, adjusting the duty cycle as described in more detail below to achieve the desired uniform temperature profile in the test cavity.

Figure 7:
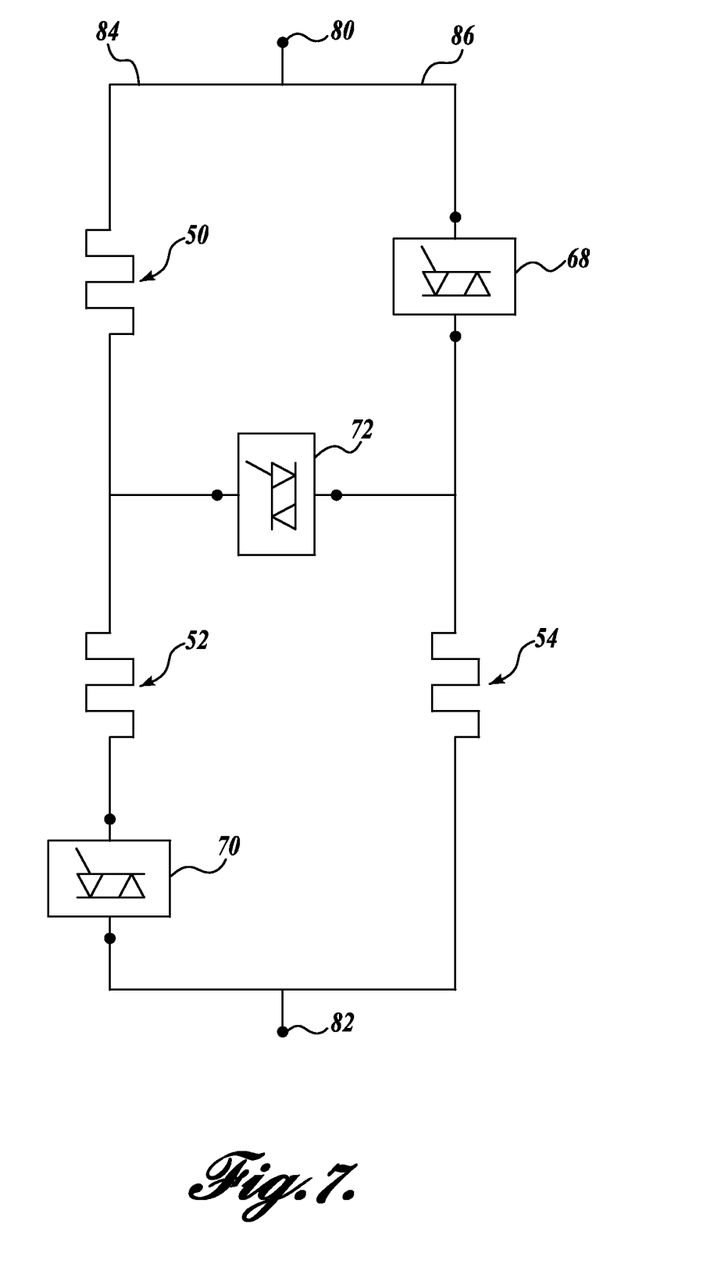
FIG. 7 is a simplified circuit diagram of components of the control circuitry for a furnace in accordance with FIG. 6 or FIG. 6A, and FIGS. 7A-7C are corresponding circuit diagrams illustrating operation of such circuitry.

FIG. 7 is a diagram of the heating element wiring in a first embodiment of the present invention. The system power (preferably 240 V AC) is applied between the top and bottom terminals 80 and 82. From the top terminal 80, a branch 84 to the left extends first through one low power rated end heating element 50 and continues to the other of the low power rated end elements 52, then to a first solid state relay 70 (called the "zone" relay) and from there to the other power terminal 82. A branch 86 to the right from the top power terminal 80 has a second solid state relay 68 (called the "center" relay) and then extends through the higher power rated center heating element 54 and then to the bottom power terminal 82. A third solid state relay (referred to as the "balance" relay) is connected between the first two branches, one end extending from a point between the two end heating elements 50, 52 and a point between the center relay 68 and the center heating element 54.

Figure 7A:
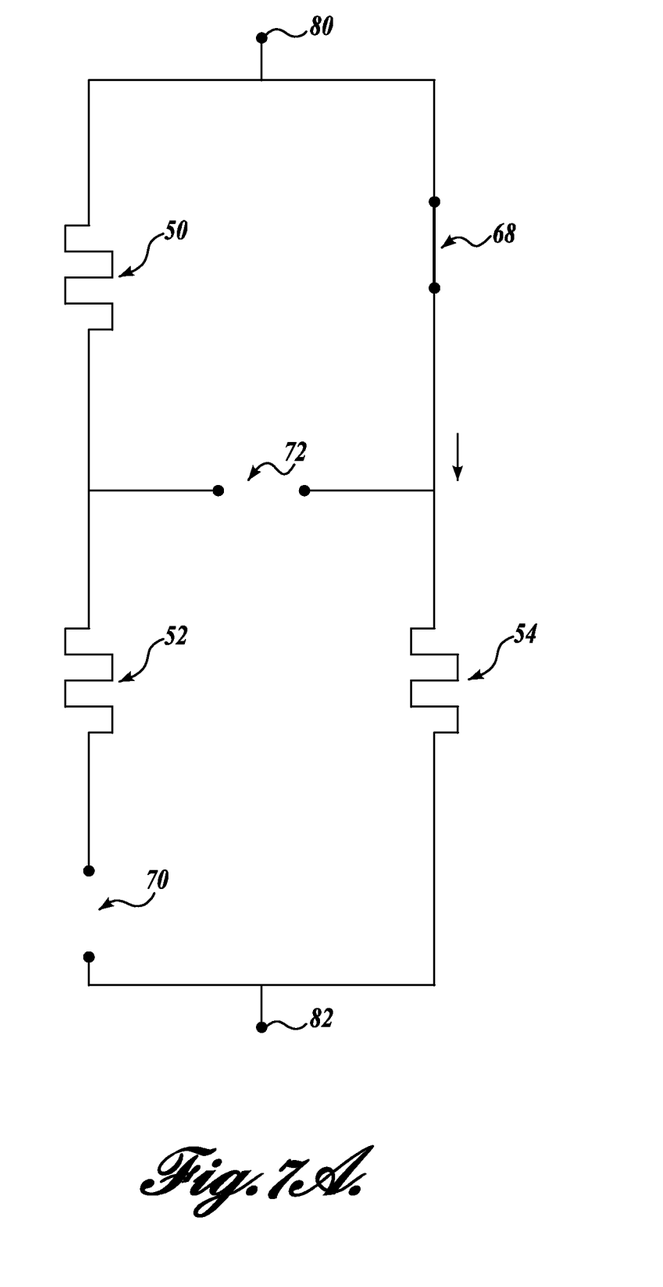
Figure 7B:
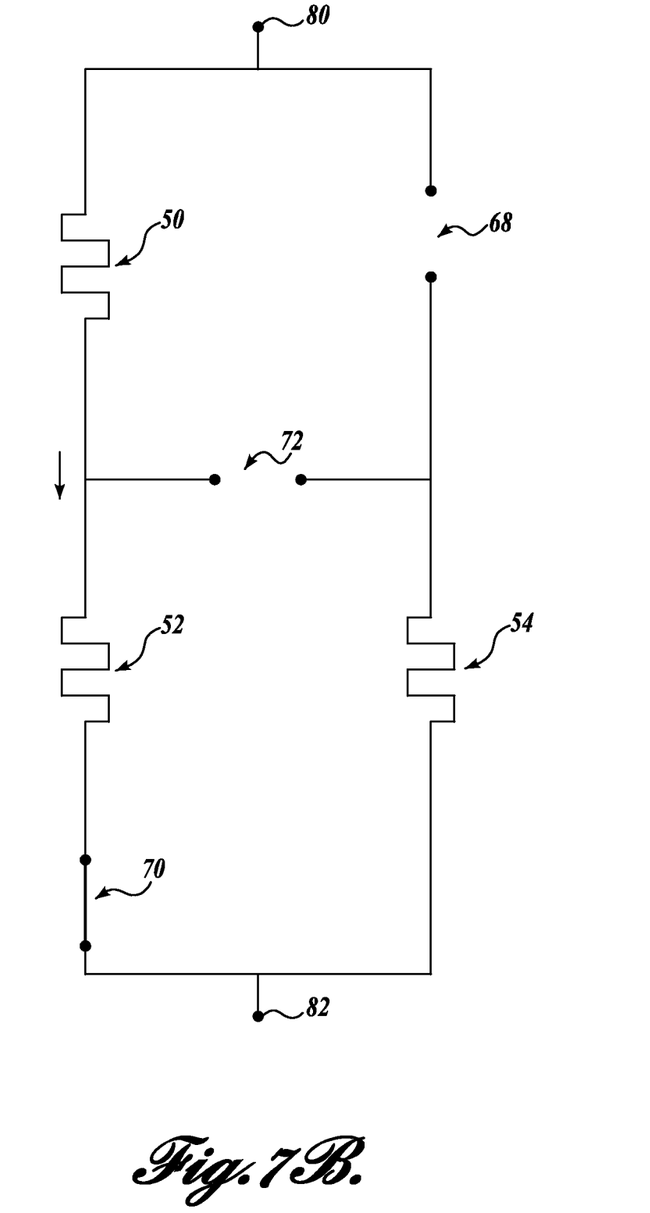
Figure 7C:
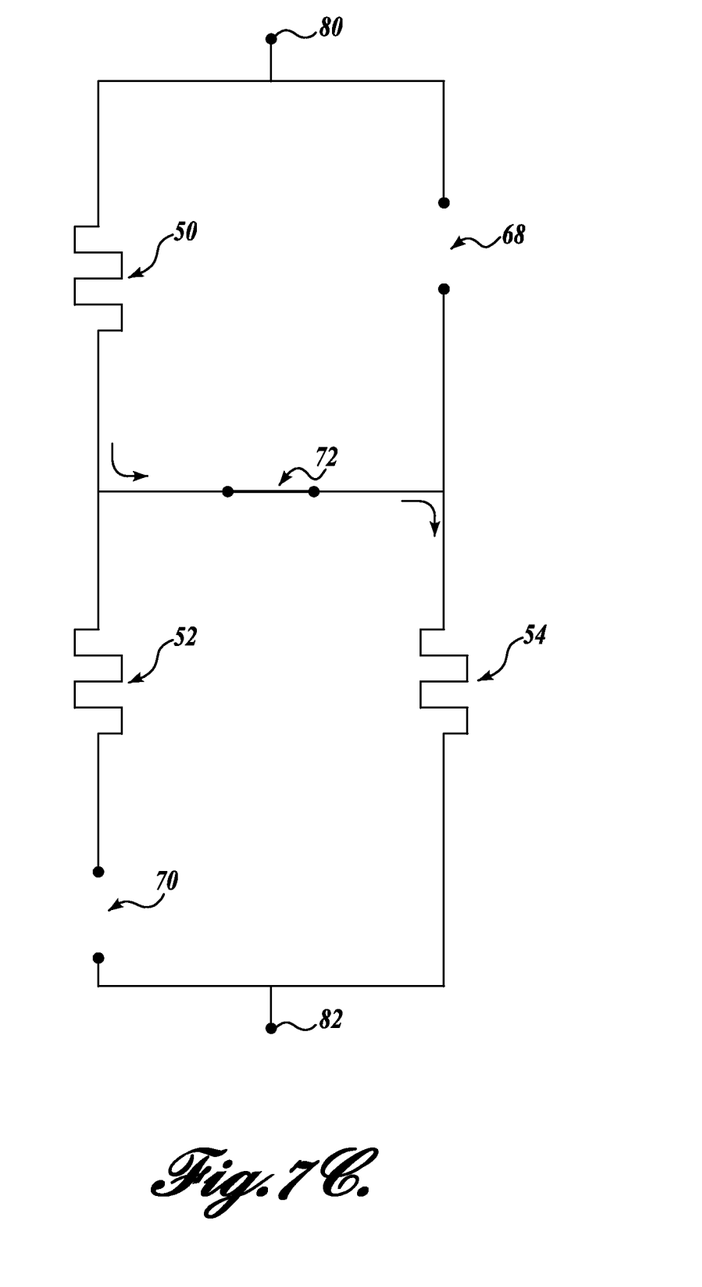

Using the circuit of FIG. 7, heater control can be done in three distinct phases within the control cycle. With reference to FIG. 7A, during a first phase the center relay 68 is switched on and the balance relay 72 and zone relay 70 are switched off. As indicated by the arrow, current flows only through the center heating element 54. In the second phase of the control cycle represented in FIG. 7B, the center relay 68 and the balance relay 72 are turned off and the zone relay 70 is turned on. Current flows through first one end heating element 50, then the other 52. With reference to FIG. 7C, in the third phase within the control cycle, the center relay 68 and the zone relay 70 are turned off, and the balance relay 72 is turned on. Current flows through the first end heating element 50 and through the center heating element 54.

The above-described scheme allows three dimensions of heater power control, and thus three way adjustment of the temperature profile. The total average power all heating elements receive determines the average temperature of the furnace. The proportion of time the outer heater sections receive power while the center heater is off determines the amount of curvature there is in the temperature profile. The proportion of time only the balance relay is on determines the slope of the temperature profile through the center region. The duration of each phase within each control cycle can be adjusted to achieve a uniform temperature profile throughout the center region of the furnace. This particular scheme is appropriate when it is known which end of the furnace will tend toward being cooler than the other, such as when the furnace design results in more heat loss at one end, e.g., by greater exposure to the atmosphere or more heat convection at one end. The end tending toward a colder temperature can have its heating element configured in a series circuit with the center heating element during the described third phase of the control cycle.

In one embodiment, the controller adjusts the relative durations of the distinct phases of the control cycle based on readings of the temperature sensors. In a representative embodiment, the control cycle may be one half second to two seconds long. By way of example, to achieve a desired temperature, it may be necessary for the center heating element to operate for 0.2 seconds, and the end heater elements to operate for approximately the same length of time, but in order to achieve the end-to-end uniform temperature, it may be necessary to operate the balance phase for a period approximately one-half the period of the first and second phases. This can be determined during calibration of the furnace. Thereafter, the controller can operate the cycle with the same proportionate time of the three distinct phases, adjusting them to be proportionately longer for a higher desired temperature, and proportionately lower for a lower desired temperature. Also, the first and second phases can be performed simultaneously by opening the balance relay while closing both of the center and zone relays, in addition to or instead of being performed consecutively. The duration of the "combined" phase one and two operation can be adjusted accordingly so that the simultaneous supply of power to all three heating elements achieves the same amount of heating as a consecutive operation and the desired uniform temperature profile in the test cavity.

Figure 8:
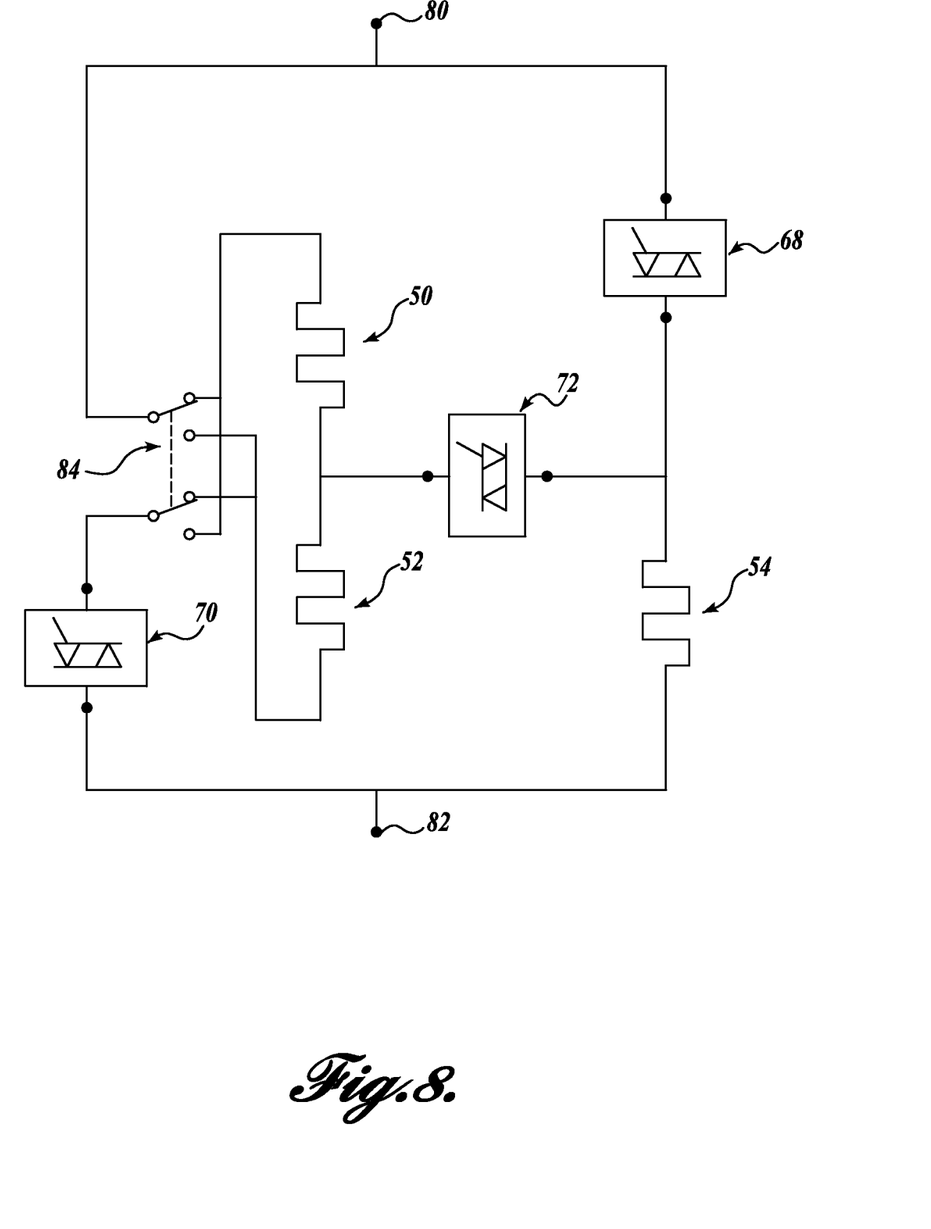
FIG. 8 is a simplified circuit diagram of components of alternative control circuitry for a furnace in accordance with FIG. 6 or FIG. 6A.

In some situations, it is not known which of the two end portions will tend toward a cooler temperature than the other. The diagram of FIG. 8 shows a circuit with an additional double pole relay 84 allowing one or the other of the end heaters 50, 52 to be powered concurrently with the center heater 54 in the third phase. With the control relay 84 in the position shown, and the center and zone relays 68, 70 turned off, and with the balance relay 72 turned on, current will flow through the first end heater 50, the balance relay 72, and the center heater 54. If, however, it is determined that the other end of the heater tends to run cooler, the position of the control relay 84 can be switched whereby, again with the center and zone relays 68, 70 open and the balance relay 72 closed, during the third or balance phase of the control cycle, current will flow through both the second end heater element 52 and the center heater element 54. In the first and second phases, operation is the same as for the embodiment described above. More specifically, the center relay 68 can be closed and the balance and zone relays 70, 72 opened such that all current supplied during the first phase passes through the center heating element 54. Similarly, with the balance and center relays 72, 68 open and the zone relay 70 closed, current is passed through both the first and second end heating elements 50, 52 during the second phase. In appropriate situations the first and second phases can be performed simultaneously (in part or instead of only consecutive operation) by closing both the zone and center relays and opening the balance relay during part of the duty cycle.

The described invention allows three-way control of the temperature profile. To work well, the duration of each of the phases within each control cycle must be precisely regulated. The controller drives the gates or triggers of the relays, switching them on and off at precise times necessary to achieve accurate control of the furnace temperature and temperature profile. The controller may, and typically does, use two or more temperature sensors to measure the temperature and the temperature profile, and the controller uses that feedback to make adjustments to the average temperature power and the balance of heater power to correct the temperature and temperature profile. Once the cooler end of the furnace is known, two sensors are effective to achieve adequate feedback, one approximately centered in the test zone (which is centered in the center heating element) and one positioned in the end heating element at the cooler end of the furnace. The controller performs all the mathematical calculations necessary to determine how the relays should be switched on and off during each control cycle to achieve stable and uniform temperature control.

While illustrative embodiments have been illustrated and described, it will be appreciated that various changes can be made therein without departing from the spirit and scope of the invention.

The embodiments of the invention in which an exclusive property or privilege is claimed are defined as follows:

1. A high temperature calibration furnace comprising:
   a core having an elongated central test cavity for testing/calibration of a temperature-sensitive component, the core having at least three electrical heating elements adjacent to the test cavity for heating of the test cavity by a supply of electrical power to the heating elements, the heating elements including a first end heating element adjacent to a first end portion of the test cavity, a second end heating element adjacent to a second end portion of the test cavity opposite the first end portion thereof, and a central heating element between the first and second end heating elements; and
   control circuitry for managing the supply of electrical power from a power supply to the first end heating element, the second end heating element, and the central heating element, the control circuitry having operating means for periodically configuring interconnections of the first end heating element, the second end heating element, and the central heating element during multiple phases of a duty cycle, including a first phase in which the power supply is electrically connected to the central heating element such that electrical current passes only through the central heating element, a second phase in which the power supply is electrically connected to the first and second end heating elements in series, and a third phase in which the power supply is electrically connected to one of the first and second end heating elements and the central heating element in series such that electrical current passes only through one of the first and second heating elements and the central heating element in series without passing through the other of the first and second end heating elements.

2. The furnace defined in claim 1, in which the central heating element does not overlap either of the first or second end heating elements.

3. The furnace defined in claim 1, in which the operating means includes a microprocessor controlling the interconnections of the heating elements during the duty cycle.

4. The furnace defined in claim 1, in which the operating means configures the interconnections of the heating elements so that the first and second phases are performed at least partially simultaneously.

5. The furnace defined in claim 1, in which the operating means configures the interconnections of the heating elements so that the phases are performed consecutively.

6. The furnace defined in claim 1, in which the control circuitry includes a first circuit branch in which a first solid state relay is connected in series with the central heating element, and a second circuit branch in which a second solid state relay is connected in series with the first end heating element and the second end heating element, and in which a third solid state relay is connected between the first and second circuit branches at a first point between the first solid state relay and the central heating element and a second point between the first end heating element and the second end heating element, the operating means controlling the interconnections of the heating elements by periodically controlling the conditions of the solid state relays.

7. The furnace defined in claim 6, in which the duty cycle has a duration of 0.5 second to 2 seconds.

8. The furnace defined in claim 1, in which the control circuitry includes a first circuit branch in which a first solid state relay is connected in series with the central heating element, and a second circuit branch in which a second solid state relay is connected in series with the first end heating element and the second end heating element, and in which a third solid state relay is connected between the first and second circuit branches at a first point between the first solid state relay and the central heating element and a second point between the first end heating element and the second end heating element, the operating means including a microprocessor controlling the interconnections of the heating elements during the duty cycle by periodically controlling the conditions of the solid state relays.

9. A method of operating a high temperature calibration furnace having an elongated central test cavity for testing/calibration of a temperature-sensitive component, said furnace having at least three electrical heating elements each adjacent to the test cavity including a first end heating element adjacent to a first end of the test cavity, a second end heating element adjacent to a second end of the test cavity opposite the first end thereof, and a central heating element between the first and second end heating elements, said method comprising managing the supply of power from a power supply to the at least three electrical heating elements by periodically configuring interconnections of the at least three heating elements during multiple phases of a duty cycle, including:

during a first phase, electrically connecting the power supply to the central heating element such that electrical current from the power supply passes only through the central heating element;

during a second phase, electrically connecting the power supply to the first and second end heating elements in series such that electrical current from the power supply passes only through the first and second end heating elements in series; and during a third phase, electrically connecting the power supply to the central heating element and one of the first and second end heating elements in series such that electrical current from the power supply passes only through the central heating element and one of the first and second end heating elements in series without passing through the other of the first and second end heating elements.

10. The method of claim 9, including performing the first and second phases at least partially simultaneously.

11. A high temperature calibration furnace comprising:
a core having a test cavity;
a first end heating element adjacent to a first end portion of the test cavity;
a second end heating element adjacent to a second end portion of the test cavity opposite the first end portion thereof;
a central heating element adjacent to the test cavity between the first and second end heating elements; and
control circuitry that manages a supply of electrical current from a power supply to the first end heating element, the second end heating element, and the central heating element,
wherein the control circuitry periodically configures interconnections of the first end heating element, the second end heating element, and the central heating element during multiple phases of a duty cycle, including a first phase in which the power supply is eleectrically connected to the central heating element such that electric current passes only through the central heating element, a second phase in which the power supply is electrically connected to the first and second end heating elements in series such that electrical current passes only through the first and second end heating elements in series, and a third phase in which the power supply is electrically connected to one of the first and second end heating elements and the central heating element in series such that electrical current passes only through one of the first and second heating elements and through the central heating element in series without passing through the other of the first and second end heating elements.

12. The furnace defined in claim 11, in which the central heating element does not overlap either of the first or second end heating elements.

13. The furnace defined in claim 11, in which the control circuitry includes a microprocessor that is programmed to control the interconnections of the heating elements during the multiple phases of the duty cycle.

14. The furnace defined in claim 11, in which the control circuitry configures the interconnections of the heating elements so that the first and second phases are performed at least partially simultaneously.

15. The furnace defined in claim 11, in which the control circuitry configures the interconnections of the heating elements so that the phases are performed consecutively.

16. The furnace defined in claim 11, in which the control circuitry includes:
a first circuit branch in which a first relay is connected in series with the central heating element;

a second circuit branch in which a second relay is connected in series with the first end heating element and the second end heating element; and
a third relay connected between the first and second circuit branches at a first point between the first relay and the central heating element and a second point between the first end heating element and the second end heating element,
wherein the control circuitry configures the interconnections of the heating elements by periodically controlling the first, second, and third relays.

17. The furnace defined in claim 16, wherein at least one of the first relay, the second relay, and the third relay is a solid state relay.

18. The furnace defined in claim 11, in which the control circuitry includes:
a first circuit branch in which a first relay is connected in series with the central heating element;
a second circuit branch in which a second relay is connected in series with the first end heating element and the second end heating element; and
a third relay connected between the first and second circuit branches at a first point between the first relay and the central heating element and a second point between the first end heating element and the second end heating element,
wherein the control circuitry includes a microprocessor that is programmed to control the interconnections of the heating elements during the multiple phases of the duty cycle by periodically controlling the first, second, and third relays.

19. The furnace defined in claim 18, wherein at least one of the first relay, the second relay, and the third relay is a solid state relay.

20. The furnace defined in claim 11, in which the duty cycle has a duration of 0.5 second to 2 seconds.

21. A high temperature calibration furnace comprising:
a core having a test cavity;
a first end heating element adjacent to a first end portion of the test cavity;
a second end heating element adjacent to a second end portion of the test cavity opposite the first end portion thereof;
a central heating element adjacent to the test cavity between the first and second end heating elements; and
control circuitry that manages a supply of electrical current to the first end heating element, the second end heating element, and the central heating element,
wherein the control circuitry includes:
a first circuit branch in which a first relay is connected in series with the central heating element;
a second circuit branch in which a second relay is connected in series with the first end heating element and the second end heating element; and
a third relay connected between the first and second circuit branches at a first point between the first relay and the central heating element and a second point between the first end heating element and the second end heating element, and
wherein the control circuitry periodically configures interconnections of the first end heating element, the second end heating element, and the central heating element during multiple phases of a duty cycle, including a first phase in which electrical current is passed through the central heating element, a second phase in which current is passed through the first and second end heating elements in series, and a third phase in which current is passed through one of the first and second end heating elements and through the central heating element in series without passing current through the other of the first and second end heating elements.

* * * * *